United States Patent
Chen

(10) Patent No.: US 10,844,254 B2
(45) Date of Patent: Nov. 24, 2020

(54) URETHANE ACRYLATE HYBRID STRUCTURE ADHESIVES

(71) Applicant: HERCULES LLC, Wilmington, DE (US)

(72) Inventor: Jianxia Chen, Dublin, OH (US)

(73) Assignee: HERCULES LLC, Wilmington, DE (US)

( * ) Notice: Subject to any disclaimer, the term of this patent is extended or adjusted under 35 U.S.C. 154(b) by 0 days.

(21) Appl. No.: 16/113,944

(22) Filed: Aug. 27, 2018

(65) Prior Publication Data

US 2019/0062612 A1 Feb. 28, 2019

Related U.S. Application Data

(60) Provisional application No. 62/552,436, filed on Aug. 31, 2017.

(51) Int. Cl.

| | |
|---|---|
| C08G 18/67 | (2006.01) |
| C08G 18/10 | (2006.01) |
| C09J 175/04 | (2006.01) |
| C09J 167/04 | (2006.01) |
| C09J 133/10 | (2006.01) |
| C09J 5/04 | (2006.01) |
| C09J 5/02 | (2006.01) |
| C09J 171/02 | (2006.01) |
| C08G 18/24 | (2006.01) |
| C08G 18/76 | (2006.01) |
| C08G 18/08 | (2006.01) |
| C08G 18/42 | (2006.01) |
| C08G 18/79 | (2006.01) |
| C08G 18/48 | (2006.01) |
| C08F 290/06 | (2006.01) |
| C08G 18/32 | (2006.01) |
| C08G 18/40 | (2006.01) |
| C08G 18/18 | (2006.01) |
| C08G 18/16 | (2006.01) |
| C08K 5/55 | (2006.01) |
| C08K 5/23 | (2006.01) |
| C08K 5/58 | (2006.01) |
| C08K 3/34 | (2006.01) |
| C08K 3/36 | (2006.01) |
| C08K 3/04 | (2006.01) |
| C08K 3/22 | (2006.01) |
| C08K 3/013 | (2018.01) |

(52) U.S. Cl.
CPC ......... *C09J 175/04* (2013.01); *C08F 290/067* (2013.01); *C08G 18/0885* (2013.01); *C08G 18/10* (2013.01); *C08G 18/163* (2013.01); *C08G 18/1883* (2013.01); *C08G 18/242* (2013.01); *C08G 18/246* (2013.01); *C08G 18/3206* (2013.01); *C08G 18/3246* (2013.01); *C08G 18/4018* (2013.01); *C08G 18/4233* (2013.01); *C08G 18/4269* (2013.01); *C08G 18/4825* (2013.01); *C08G 18/4837* (2013.01); *C08G 18/4866* (2013.01); *C08G 18/7664* (2013.01); *C08G 18/7671* (2013.01); *C08G 18/797* (2013.01); *C09J 5/02* (2013.01); *C09J 5/04* (2013.01); *C09J 133/10* (2013.01); *C09J 167/04* (2013.01); *C09J 171/02* (2013.01); C08K 3/013 (2018.01); C08K 3/04 (2013.01); C08K 3/22 (2013.01); C08K 3/346 (2013.01); C08K 3/36 (2013.01); C08K 5/23 (2013.01); C08K 5/55 (2013.01); C08K 5/58 (2013.01); C08K 2003/2227 (2013.01); C08K 2003/2237 (2013.01); C08K 2003/2265 (2013.01); *C09J 2409/006* (2013.01); *C09J 2423/106* (2013.01); *C09J 2463/006* (2013.01); *C09J 2467/006* (2013.01)

(58) Field of Classification Search
CPC ........ C08G 18/42; C08G 18/66; C08G 63/16; C09J 175/04; C09J 175/06
See application file for complete search history.

(56) References Cited

U.S. PATENT DOCUMENTS

| | | | |
|---|---|---|---|
| 6,555,625 B1 * | 4/2003 | Overbeek | C08G 18/0823 428/423.1 |
| 2006/0052523 A1 * | 3/2006 | Bushendorf | B32B 7/12 524/589 |
| 2009/0247720 A1 * | 10/2009 | Wang | C08G 18/672 528/7 |

FOREIGN PATENT DOCUMENTS

WO WO-2018086029 A1 * 5/2018 ......... B32B 37/1207

* cited by examiner

*Primary Examiner* — Michael L Leonard
(74) *Attorney, Agent, or Firm* — William J. Davis; Nathalie Tietcheu

(57) ABSTRACT

A polymerizable adhesive composition comprising a two-part hybrid polymerizable adhesive composition is disclosed. In particular, the polymerizable adhesive composition comprises an organoborane monoamine complex, a free polyol comprising a dimer fatty polyol and a polyether polyol, at least one free radically polymerizable component, an isocyanate-terminated urethane pre-polymer, a free isocyanate and a low molecular weight chain extending compound. Also disclosed is methods of making and using a hybrid adhesive obtained from polymerization of the polymerizable adhesive composition.

19 Claims, No Drawings

URETHANE ACRYLATE HYBRID STRUCTURE ADHESIVES

CROSS REFERENCE TO RELATED APPLICATIONS

The present application claims the benefit under 35 U.S.C. 119 (e) of U.S. Provisional Patent Application Ser. No. 62/552,436, filed on Aug. 31, 2017, the entire content of which is hereby expressly incorporated herein by reference.

BACKGROUND OF THE INVENTION

1. Field

The presently disclosed process(es), procedure(s), method(s), product(s), result(s), and/or concept(s) (collectively referred to hereinafter as the "present disclosure") relates generally to a polymerizable adhesive composition comprising a two-part hybrid adhesive composition, and methods of making and using a hybrid adhesive obtained from polymerization of the two-part hybrid adhesive composition. In particular, the polymerizable adhesive composition comprises an organoborane complex, a free polyol comprising a dimer fatty polyol and a polyether polyol, at least one free radically polymerizable component, an isocyanate-terminated urethane pre-polymer, a free isocyanate and a low molecular weight chain extending compound. The hybrid adhesive is obtained from a step-growth formation of a polyurethane that occurs simultaneously with additional polymerization of a free radically polymerizable component.

2. Background

Bonding of dissimilar materials poses difficult challenges for industrial adhesives. Different substrate materials have different coefficients of thermal expansion. When materials warm up, they expand but at different rates. For example, a long aluminum profile bonded to glass is expanding and contracting, and the glass can shatter because of thermal shock.

Generally, the industrial adhesives for bonding dissimilar materials must have low modulus and high elongation in addition to excellent adhesion. To meet these requirements, enormous quantities of plasticizers and toughening agents are added into polymerizable adhesive compositions. In addition, primers are also used on some materials for good adhesion. Therefore, the need exists for a polymerizable adhesive composition which can provide low modulus, high elongation, and excellent adhesion for bonding various dissimilar substrates in the absence of plasticizers and/or toughening agents.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or openended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, Aft AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many.

The present disclosure is directed to a polymerizable adhesive composition. More specifically, the present disclosure is directed to a polymerizable two-part hybrid adhesive composition, in which Part A prepolymer component comprises an isocyanate-terminated urethane pre-polymer, a free isocyanate and at least one free radically polymerizable component and Part B curative component comprises an organoborane complex, a free polyol comprising a dimer fatty polyol and a polyether polyol, and a low molecular weight chain extending compound. Upon combination of the two parts, the free isocyanate acts as a decomplexing agent for the organoborane complex and liberate the borane, which subsequently initiates a free radical polymerization of the free radically polymerizable component along with a step-growth formation of a polyurethane by reacting the isocyanates with the polyols. In one aspect, the two-part hybrid adhesive composition comprises a two-part urethane/acrylate hybrid adhesive composition that can produce a hybrid polymer of polyurethane and polyacrylate.

The isocyanate-terminated urethane prepolymer available commercially can directly be used in the two-part hybrid adhesive composition. For example, Vorite® 689, commercially available from Caschem, can be used. The isocyanate-terminated urethane prepolymer can also be prepared in-situ from polymerization of excess isocyanates with polyols. As a result, the Part A prepolymer component can comprise a stoichiometric isocyanate, a stoichiometric polyol, an excess isocyanate and at least one free radically polymerizable component.

The free isocyanate, the stoichiometric isocyanate and the excess isocyanate can be the same or different isocyanates. Any suitable isocyanates, which contains two or more isocyanate groups, can be used in the present disclosure as the stoichiometric isocyanates, the excess isocyanates and the free isocyanates. The isocyanates can be polyisocyanates including aromatic, aliphatic and cylcoaliphatic polyisocyanates.

The polyisocyanates can be diisocyanates that include aliphatic, cycloaliphatic, aromatic and aliphatic-aromatic diisocyanates. Specific examples of the aliphatic and cycloaliphatic diisocyanates can include, but are not limited to, ethylene diisocyanate, ethylidene diisocyanate, propylene diisocyanate, butylene diisocyanate, trimethylene diisocyanate, cyclopentylene-1,3-diisocyanate, cyclo-hexylene-1,4-diisocyanate, cyclohexylene-1,2-diisocyanate, dichloro-hexa-methylene diisocyanate, furfurylidene diisocyanate, 1,4-tetramethylene diisocyanate, 1,6-hexamethylene diisocyanate, 2,2,4-trimethyl-1,6-hexamethylene diisocyanate, 1,12-dodecamethylene diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 2,4'-dicyclohexylmethane diisocyanate, 1,3- or 1,4-bis-(isocyanatomethyl)-cyclohexane, bis-(4-isocyanato-3-methylcyclohexyl)-methane, α',α',α',α'-tetramethyl-1,3- and/or -1,4-xylylene diisocyanate, 1-isocyanato-1-methyl-4 (3)-isocyanatomethyl cyclohexane, 2,4- or 2,6-hexahydrotoluylene diisocyanate, and the like.

Specific examples of the aromatic and aliphatic-aromatic diisocyanates can include, but are not limited to, 2,4- or 2,6-toluene diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, 1-chlorobenzene-2,4-diisocyanate, 4,4',4"-triisocyanatotriphenylmethane, 1,3,5-triisocyanatobenzene, 2,4,6-triisocyanato-toluene, 4,4'-dimethyldiphenyl-methane-2,2',5,5-tetratetraisocyanate, and modified aromatic diisocyanates containing carbodiimide groups, urethane groups, alophanate groups, isocyanurate groups, urea groups or biuret.

The modified aromatic diisocyanate can be uretonimine modified isocyanate, which can be derived from 2,4- or 2,6-tolylene diisocyanate; or derived from 4,4'- or 2,4'-diphenylmethane diisocyanate such as uretonimine modified 4,4'-diphenylmethane diisocyanate. Suitable uretonimine modified isocyanates can include Rubinate® 1680, commercially available from Huntsman Corporation; and ISONATE™ 143L Modified MDI, commercially available from The Dow Chemicals Company.

In one non-limiting embodiment, the isocyanates can be hexamethylene diisocyanate, toluene diisocyanate (TDI), isophoronediisocyanate (IPDI), methyenebisphenyldiisocyanate (MDI), hydrogenated MDI (HMDI) or poly-MDI (with functionality greater than 2).

The stoichiometric polyols can be any polyols that are suitable for making polyurethanes. They can be polyols based on polyalkylene oxides, polyester or combinations thereof, which can include bulky side chains and/or long hydrophobic chains. The polyols based on polyalkylene oxides are often referred to as polyether polyols. The polyols can also include polyamide polyols, polycaprolactone polyols such as poly-ε-caprolactone polyol, polycarbonate polyols, hydroxyl terminated polybutadienes such as fully-hydrogenated hydroxy-terminated polybutadiene and/or partially-hydrogenated hydroxy-terminated polybutadiene, polyisobutylene diols, as well as mixtures thereof.

Polyether polyols can include a linear and/or branched polyether having hydroxyl groups. Examples of the polyether polyols may include substituted and/or unsubstituted polyoxyalkylene polyols such as polyethylene glycol, polypropylene glycol, polybutylene glycol and the like. Further, a homopolymer and a copolymer of the polyoxyalkylene polyols may also be employed. Particularly, the copolymers of the polyoxyalkylene polyols may include an adduct having at least one compound selected from the group consisting of ethylene glycol, propylene glycol, diethylene glycol, dipropylene glycol, triethylene glycol, 2-ethylhexanediol-1,3-glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

These polyether polyols are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extending compounds of the present disclosure, propylene glycol, glycerin, ethylene glycol, triethanolamine, water, trimethylolpropane, bisphenol A, aniline, ammonia, ethanolamine and ethylene diamine.

The polyether polyols can include polymers of propylene oxides and/or copolymers of ethylene and propylene oxides, wherein the oxides contain. In one non-limiting embodiment, the polyether polyol is ethylene oxide capped polypropylene oxide.

The number average molecular weights of the polyether polyol can typically be varied from about 2,000 to about 20,000 Daltons or in a range of about 3,500-12,000 Daltons. For example, Acclaim® 4220N polyol (commercially available from Covestro) is based on propylene oxide and terminated by ethylene oxide, having number average molecular weights of 4000 Daltons.

The polyether polyols used in the present disclosure may include one or more 2-functionality polyether polyols, one or more 3-functionality polyether polyols, one or more 4-functionality polyether polyols, or their combinations thereof. The number average molecular weights of the 2-functionality polyether polyols can be varied from about 2,000 to about 20,000 Daltons, or in a range of about 2,000-12,000 Daltons. For example, Pluracol® P2010 is a polyether polyol having a number average molecular weight of 2000 Daltons, which is commercially available from BASF. The molecular weight of the 3-functionality polyether polyols can be varied from about 84 to about 20,000 Daltons or in a range of about 100-12,000 Daltons, including Pluracol® TP-440 polyol commercially available from BASF. The molecular weight of the 4-functionality polyether polyols can be varied from about 100 to about 20,000 Daltons or in a range of about 400-12,000 Daltons. For example, Pluracol® 355 is a polyether polyol having a number average molecular weight of 600 Daltons, which is commercially available from BASF.

The polyols based on polyesters (also called polyester polyols) can include amorphous and liquid polyester polyols, fatty acid polyester polyols such as castor oil and vegetable oils having different molecular weights and functionalities.

The polyester polyols can be formed as reaction products of one or more carboxylic acids with one or more polyols such as diols and/or triols. Among the carboxylic acids useful in forming the polyester polyols can include, but are not limited to, adipic, glutaric, succinic, malonic, oxalic and mixtures thereof. Among the diols useful in forming the polyester polyols can include, but are not limited to, ethylene glycol, propanediol, butanediol, neopentyldiol, pentanediol and hexanediol and mixtures thereof. Among the triols which are considered useful in forming the polyester polyol can include trimethylol propane.

Examples of the fatty acid polyester polyols may include castor oil, the products of hydroxylation of unsaturated or polyunsaturated natural oils, the products of hydrogenations of unsaturated or polyunsaturated polyhydroxyl natural oils, polyhydroxyl esters of alkyl hydroxyl fatty acids, polymerized natural oils, soybean polyol, alkylhydroxylated amides of fatty acids, and cashew nutshell liquid.

In one non-limiting embodiment, the polyester polyol can be obtained from a reaction of a triol with azelaic acid. The triol can be glycerol. One example of such polyester polyol is Emerox® 14001, which is derived from natural oils and commercially available from Emery Oleochemicals Company.

The number average molecular weight of the polyester polyol is typically varied from about 1,000 to about 20,000 Daltons, or in a range of about 1,300-10,000 Daltons. Admex™ 525 polyol (commercially available from Eastman Chemical Company) is a 1,400-molecular-weight polyester polyol and may be used.

The natural substitutes of the polyester polyols can also be used to make the isocyanate-terminated urethane prepolymer. Cardanol such as 3-(8-pentadecenyl)phenol, a natural phenolic compound with a long chain unsaturated fatty side chain that is extracted from cashew nuts can be used. For example, GX-9201 polyol (commercially available from Cardolite Corporation), a 1,500-molecular-weight polyester diol with a long unsaturated fatty side chain may be used.

Either polyester polyols or polyether polyols can contain bulky side chains and/or long hydrophobic chains. The bulky side chains can act as an umbrella. The number average molecular weight of the polyol with bulky side chains is typically varied from about 1,000 to about 20,000 Daltons, or in a range of about 2,000-12,000 Daltons. The number average molecular weight of the polyol with long hydrophobic chains is typically varied from about 1,000 to about 20,000 Daltons, or in a range of about 1,500-12,000 Daltons.

NCO contents in the isocyanate-terminated urethane prepolymer can be ranged from about 1% to about 30% by weight, or from about 5% to about 20% by weight based on the weight of the isocyanate-terminated urethane prepolymer.

In one non-limiting embodiment, the isocyanate-terminated urethane prepolymers can be prepared by mixing polyols, drying the polyols at the temperature from about 80 to about 105° C., adding diisocyanates at about or less than 65° C., and increasing the temperature to about 80 to about 105° C., allowed to react at this temperature range for about one hour or until the isocyanate content (as determined by n-butyl amine titration) reaches the theoretical value (or slightly lower). The reaction can be conducted under vacuum.

The at least one free radically polymerizable component in the present disclosure can include any monomers, oligomers, polymers or mixtures thereof which can contain olefinic unsaturation and can polymerize by free-radical addition polymerizations. Styrenic, vinyl, acrylic and methacrylic monomers and/or oligomers are suitable examples. These can include styrene, alpha-methyl styrene, vinyl esters such as vinyl neodecanoate and vinyl acetate, acrylic and methacrylic monomers or oligomers such as acrylic acid, acrylamide, acrylonitrile and acrylate. These materials form the additionally polymerized network initiated by the liberated organoborane. A variety of monomers can be used, and their choices will depend on the final adhesive properties desired and the substrates to be bonded.

Suitable acrylic monomers include acrylamide and/or methylacrylamide monomers, acrylonitrile monomers, or acrylate monomers. In one non-limiting embodiment, the acrylic monomers can be acrylate monomers. The acrylate monomers can have the chemical structure as shown below:

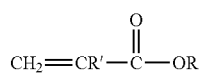

where R can be alkyl, cycloalkyl, or bicycloalkyl with or without other function groups such as hydroxyl, urethane, epoxy, or phenolic oligomers; and R' can be either hydrogen or a methyl group.

In one non-limiting embodiment, the acrylate monomers can include alkyl and cycloalkyl acrylates, alkyl methacrylates, and hydroxyl alkyl acrylates and methacrylates. Examples of the alkyl and cycloalkyl acrylates can include, but are not limited to, methyl acrylate, ethyl acrylate, n-propyl acrylate, n-butyl acrylate, t-butyl acrylate, isobutyl acrylate, isobornyl acrylate, n-octyl acrylate, 2-ethylhexyl acrylate, glycidyl acrylate, cyclohexyl acrylate, and tetrahydrofurfuryl acrylate.

The alkyl methacrylates can be selected from the group consisting of methyl methacrylate, ethyl methacrylate, n-butyl methacrylate, t-butyl methacrylate, isobutyl methacrylate, 2-ethylhexyl methacrylate, isobornyl methacrylate, decyl methacrylate, dodecyl methacrylate, glycidyl methacrylate, tetrahydrofurfuryl methacrylate, n-propyl methacrylate, and combinations thereof.

Examples of the hydroxyl alkyl acrylates and methacrylates can include, but are not limited to, hydroxy propyl acrylate, hydroxyl methyl methacrylate, hydroxyl ethyl methacrylate, hydroxy propyl methacrylate, and combinations thereof.

Acrylic and/or methacrylic oligomers can include acrylate and/or methacrylate terminated urethane, or epoxy, or both. Examples can include, but are not limited to, CN1963 (an aliphatic polyester-based urethane dimethacrylate oligomer) and CN 1964 (a low molecular weight urethane dimethacrylates,) polyurethane acrylates and bisphenol-A based acrylates as well as common crosslinkers such as hexanediol diacrylate, trimethylol propane triacrylate, and pentaerythritol triacrylate, which are all commercially available from Sartomer Americas. Other examples include EBECRYL® 4827 (an aromatic urethane diacrylate) and EBECRYL® 8804 (an aliphatic urethane diacrylate), which are commercially available from Allnex Company.

In one non-limiting embodiment, blends of tetrahydrofurfury methacrylate and hydroxyl propyl methacrylate can be used, where the equivalents of hydroxyl groups are sufficient to react with less than about 35%, or less than about 15% by equivalent of the isocyanate groups.

The free polyol in the Part B curative component comprises a dimer fatty polyol and a polyether polyol. The polyether polyol used in the Part B curative component are the same as those described previously. In one non-limiting embodiment, the polyether polyol is a polymer of propylene oxide or a copolymer of ethylene and propylene oxide.

The dimer fatty polyol can be derived from a dimer fatty acid with a diol or from a dimer fatty diol with a diacid. The term dimer fatty acid is well known in the art and refers to as a dimerization product of mono- or polyunsaturated fatty acids and/or esters. Dimer fatty acids are described in T. E. Breuer, 'Dimer Acids', in J. I. Kroschwitz (ed.), Kirk-Othmer Encyclopedia of Chemical Technology, 4th Ed., Wily, N.Y., 1993, Vol. 8, pp. 223-237, which is hereby incorporated by reference in its entirety. They can be prepared by polymerizing fatty acids under pressure, and then removing most of the unreacted fatty acid starting materials by distillation. The final products usually contain a small amount of mono fatty acid and trimer fatty acids but are mostly made up of dimer fatty acids. The resultant products can be prepared with various proportions of the different fatty acids as desired.

The dimer fatty acids used in the present disclosure are dimers that can be derived from the dimerization products of C10 to C30 fatty acids, or C12 to C24 fatty acids, or C14 to C22 fatty acids, or C16 to C20 fatty acids, or C18 fatty acids. Thus, the resulting dimer fatty acids comprise in a range of from 20 to 60, or from 24 to 48, or from 28 to 44, or from 32 to 40, or 36 carbon atoms.

The fatty acids, from which the dimer fatty acids are derived, may be selected from linear or branched unsaturated fatty acids. The unsaturated fatty acids may be selected from the fatty acids having either a cis/trans configuration and may have one or more than one unsaturated double bonds.

Suitable dimer fatty acids can be derived from (i.e. are the dimer equivalents of) the dimerization products of oleic acid, linoleic acid, linolenic acid, palmitoleic acid, or elaidic acid. In one non-limiting embodiment, the dimer fatty acid is derived from oleic acid.

The dimer fatty acids may be dimerization products of unsaturated fatty acid mixtures obtained from the hydrolysis of natural fats and oils, e.g. sunflower oil, soybean oil, olive oil, rapeseed oil, cottonseed oil, or tall oil.

The diols can be any diols that react with the dimer fatty acids. Suitable diols can include straight chain aliphatic diols such as ethylene glycol, diethylene glycol, 1,3-propylene glycol, dipropylene glycol, 1,4-butylene glycol, 1,6-hexylene glycol (also known as hexanediol) and mixtures thereof; branched diols such as neopentyl glycol, 3-methyl pentane glycol, 1,2-propylene glycol and mixtures thereof; and cyclic diols such as 1,4-bis(hydroxymethyl)cyclohexane and 1,4-cyclohexane-dimethanol and mixtures thereof.

Dimer fatty diols can be formed by hydrogenation of the corresponding dimer fatty acids. The same descriptions herein for the dimer fatty acids can apply to the corresponding dimer fatty diols.

The diacids can be any acids that can react with diols and can be selected from the group consisting of adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid, and combinations thereof. The commercially available dimer fatty polyols can be used in the present disclosure, including Priplast™ 3238 and Priplast™ 1838 polyols (commercially from Croda Coatings & Polymers) having 2,000-molecular-weight polyester diols with bulky side chain.

The dimer fatty polyols herein are specific polyester polyols with bulky side chains and thus can also be used as polyols to make isocyanate-terminated urethane prepolymers as described previously.

In addition to the dimer fatty polyols and the polyether polyols, the free polyols in the present disclosure can further comprise other polyols including urethane modified polyols. The urethane modified polyols can include hydroxyl-terminated urethane prepolymer. The hydroxyl-terminated urethane prepolymer available commercially can directly be used. The hydroxyl-terminated urethane prepolymer can also be prepared in-situ from polymerization of excess polyols with isocyanates, or from reactions of polyols with isocyanate-terminated urethane prepolymers.

In one-nonlimiting embodiment, the free polyol can further comprise a cardanol based polyester polyol or poly-ε-caprolactone polyol.

The low molecular chain extending compound can be a non-urethane modified low molecular weight chain extending compound that is either hydroxyl or amine terminated. In one non-limiting embodiment, the chain extending compound can be a hydroxyl terminated one including a low molecular weight polyol that has a molecular weight ranged from about 25 to about 1,000 Daltons, or from about 32 to about 600 Daltons. The non-urethane modified low molecular weight chain extending compound may be selected from the group consisting of ethylene glycol, diethylene glycol, 1,5-pentandiol, 1,3-pentandiol, 1,3-butanediol, 1,4-butylene glycol, 1,2-propylene glycol, 1,3-propylene glycol, 1,6-hexylene glycol, dipropylene glycol, neopentyl glycol, 3-methyl pentane diol, 1,4-cyclohexane-dimethanol, and the combinations thereof. In one non-limiting embodiment, the non-urethane modified low molecular weight chain extending compounds can include 1,4-butylene glycol, ethylene glycol, 1,2-propylene glycol, dipropylene glycol and the combinations thereof.

The organoborane complex in the present disclosure comprises an oxidatively stable complex of a trialkyl borane with a nitrogen-containing compound. It can be formed in-situ, during mixing of this part of the adhesive composition, or for ease of processing that is formed in a separate step. The structure of the complex can be varied to alter the reactivity. Procedures for preparation of the organoborane complexes and the stability of various complexes are described in M. F. Sonnenschein et al., Macromolecules, 2006, 39, 2507-2513, and U.S. Pat. No. 6,710,145 B2, which are hereby incorporated by reference in their entireties.

The alkyl group in the organoborane complex can include a C1-C10 alkyl or C4-C10 alkyl cycloalkyl. In one non-limiting embodiment, the alkyl groups are C1-C5 alkyls, linear and/or branched.

The nitrogen-containing compound can be substituted and/or unsubstituted primary, secondary, tertiary amines; diamines; pyridines; pyrroles; and carbazoles. Examples of the organoborane complex can include, but are not limited to, triethylborane dimethylaminopropyl amine complex, tributylborane dimethylaminopropyl amine complex, triethylborane pyrrolidine complex, tri-t-butylborane pyrrolidine complex, triethylborane pyridine complex, tri-t-butyl pyridine complex, triethylborane methoxypropyl amine complex, and tributylborane methoxypropyl amine complex. In one non-limiting embodiment, the organoborane complex is tributylborane methoxypropyl amine complex.

In addition, the Part B curative component may, optionally, comprise a polyamine to create chemical thixotropy in the blended system by immediately reacting with the isocyanate in the Part A prepolymer component to form a pseudo gel creating body to eliminate sag. The polyamine may be aliphatic, cycloaliphatic or aromatic, having a functionality of about 2 or higher and should not be sterically hindered as to prevent immediate reaction with isocyanate. The polyamines can be diamines, triamines, tetraamines and related polymeric amines where the polyamines can contain 2, 3, 4 ore more nitrogen atoms.

The chemical thixotropy creating amines can be those comprising primary or secondary amine groups. Examples of the primary or secondary diamines can include, but are not limited to, hadrazine, ethylene diamine, propylene diamine, butylene diamine, amylene diamine, hexylene diamine, isophorone diamine and methane dianiline, toluene diamine, isophorone diamine, 2-methyl-1,5-pentane diamine, diethylene triamine, pentamethylene diamine, 1-methyl-3,5-diethyl-2,6-diamino benzene, diethylene diamine, hexamethylenediamine, bis(4-aminocyclohexyl)methane, 1-amino-3,3,5-trimethyl-5-aminomethylcyclohexane, 2,4-diaminomesitylene, 1,3,5-triethyl-2,4-diaminobenzene, 1,8-diamino napthelene, piperazine, dialkyl-N,N'-alkylene diamines where the total numbers of carbon atoms in the alkyl and alkylene can be varied from about 4 to about 20 such as dimethyl or diethyl-ethylene or propylene diamine, and combinations thereof.

In one non-limiting embodiment, the polyamine is piperazine. The concentration of the polyamine may be up to about 25 equivalent percent based on the isocyanate reactive components in the Part A prepolymer component, including from about 0 to about 25 equivalent percent, such as in a range of about 0 equivalent percent to about 20 equivalent percent, or about 1 to about 20 equivalent percent, based on the isocyanate reactive components in the Part A prepolymer component.

In the Part B curative component, the atomic ratio of hydroxyl to isocyanate can be varied from about 50:1 to about 1.5:1, or from about 25:1 to about 3:1, excluding fillers and other nonreactive components in the Part B curative component.

The Part A prepolymer component or Part B curative component may also contain fillers. Fillers suitable for use in the present disclosure, including the Part A prepolymer component and/or the Part B curative component, can include, but are not limited to, talc, mica, kaolin, bentone clay, aluminum oxides, titanium oxides, iron oxides, barium sulfate, hornblends, amphibiles, chrysotile, carbon black, carbon fibers, fumed silica, molecular sieves, calcium carbonate, wollastonite, hollow sphere glass or ceramic, glass beads, fiber glass, and combinations thereof. In one non-limiting embodiment, the filler is talc, such as MISTRON® RCS talc commercially available from Rio Tinto Minerals, London, U.K. The Part A prepolymer component may comprise up to about 60 weight percent of fillers, or from about 10 to about 40 weight percent of fillers. The Part B curative component may comprise up to about 60 weight percent of fillers, or from about 10 to about 40 weight percent of fillers.

Fumed silica, in either the Part A prepolymer component or Part B curative component, provides thixotropic viscosity enhancement to assist in the minimization of filler settling and for better mixing. Hydrophilic fumed silica, hydrophobic fumed silica, and combinations thereof may be used. AEROSIL® R972 fumed silica, commercially available from EVONIK® Industries AG, Essen, Germany may be used. The amounts of fumed silica in the Part A prepolymer component or Part B curative component may be up to about 10 weight percent, or from about 0.2 to about 5 weight percent, of the overall composition, or of each component part of the polymerizable adhesive composition.

Suitable molecular sieves can be selected such that the pore opening is appropriate for the absorption of moisture. The molecular sieves may be present in the Part A prepolymer component, the Part B curative component or in both components. In one non-limiting embodiment, the pore size is about 3 to about 5 angstroms. In one non-limiting embodiment, Type 5A molecular sieves can be used. The amounts of molecular sieves in the Part A prepolymer component or Part B curative component may be up to about 30 weight percent, or from about 1 to about 10 weight percent in either or both parts.

Catalysts may be present in the process of preparing the polymerizable adhesive composition. The Part B curative component may optionally comprise one or more catalysts. The catalysts used in the present disclosure can be tertiary amines and/or organometallic catalysts. Examples of the tertiary amines can include, but are not limited to, triethyl amine, benzyl dimethylamine, triethylenediamine, tetramethylbutane diamine, diazobicycloundecene and combinations thereof.

The organometallic catalysts can include, for example organometallic compounds of tin, lead, iron, bismuth, mercury, etc. Examples of the organometallic compounds can include, but are not limited to, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, dibutyltin dimercaptide, dibutyltin diisooctylmaleate, dibutyltin diisooctylmercaptoacetate, dimethyltin dimercaptide, dibutyltin dilaurylmercaptide, dimethyltin dilaurylmercaptide, dimethyltin diisooctylmercaptoacetate, dimethyldi(n-butyl)tin bis(isooctylmercaptoacetate), dibutyltin bisisooctyl maleate, dibutyltin di-2-ethylhexoate, dilauryltin diacetate, dioctyltin diacetate, trialkyltin hydroxide, dialkyltin oxide, dibutyltin sulfide, di(isooctyl)tin bis(isooctylmercaptoacetate), zinc neodecanate, iron acetylacetonate, and bismuth compounds such as octoate, neodecanoate, pivalate, 2-theylhexanoate, naphthanate, iron pentanedione, nickel acetylacetonate, and combinations thereof.

The catalysts can be used in amounts ranging from about 0.01 to about 10 wt %, or about 0.01 to about 1 wt %, or about 0.01 to 0.5 wt % of the Part B.

The polymerizable adhesive composition can optionally include pigments. Suitable pigments can include inorganic pigments such as transition metal salts; organic pigments such as azo compounds; and carbon black.

The Part A and Part B components are kept separate until a hybrid adhesive is used. The hybrid adhesive comprises various weight or volume ratios of the Part A component to Part B component. For example, the weight ratio of the Part A:Part B can be varied from about 10:1 to about 1:10, or from about 4:1 to about 1:4, or from about 3:1 to about 1:3, or from about 2:1 to about 1:2, or about 1:1. The volume ratio of the Part A:Part B can be varied from about 10:1 to about 1:10, or from about 4:1 to about 1:4, or from about 3:1 to about 1:3, or from about 2:1 to about 1:2, or about 1:1, it being understood that various other weight or volume ratios are within the scope of the present disclosure, as one skilled in the art will appreciate, after reading the disclosure, that all ranges and values within these explicitly stated ranges are contemplated. In one non-limiting embodiment, the volume ratio of the Part A:Part B is about 1:1.

The Part A prepolymer component comprises from about 2 wt % to about 98 wt %, or from about 30 wt % to about 98 wt %, or from about 70 wt % to about 98 wt % of the isocyanate-terminated prepolymer and from about 2 wt % to about 98 wt %, or from about 2 wt % to about 70 wt %, or from about 2 wt % to about 30 wt % of the free radically polymerizable component based on the weight of the Part A excluding fillers. The Part B curative component comprises from about 0.1 wt % to about 3 wt %, or from about 0.5 wt % to about 2 wt %, or from 0.7 wt % to about 1.5 wt % of the organoborane complex and about 75 wt % to about 99 wt %, or from about 85 wt % to about 95 wt % of the free polyols based on the weight of the Part B excluding fillers.

The amounts of polyurethane present in the resulting hybrid adhesive can be varied from about 2 wt % to about 98 wt %, or from about 30 wt % to about 98 wt %, or from about 70 wt % to about 98 wt %, all based on the reactive components excluding the fillers. The amounts of acrylic polymer present in the hybrid adhesive can be varied from about 2 wt % to about 98 wt %, or from about 2 wt % to about 70 wt %, or from about 2 wt % to about 30 wt %, all based on the reactive components excluding the fillers.

The polymerizable adhesive composition can be used for bonding dissimilar materials. The present disclosure is directed to a method for making and using a hybrid adhesive from the polymerizable adhesive composition. The method generally comprises providing the polymerizable adhesive composition described herein, applying the polymerizable adhesive composition to one or more surfaces of a first substrate and then placing at least one surface of a second substrate in contact with the polymerizable adhesive composition, and allowing the hybrid adhesive to cure.

In one non-limiting embodiment, the method comprises providing the polymerizable adhesive composition described herein, mixing the Part A prepolymer component and Part B curative component to form a mixture, applying the mixture to one or more surfaces of a first substrate and then placing at least one surface of a second substrate in contact with the mixture, and allowing the hybrid adhesive to cure.

The Part A prepolymer component and Part B curative component upon application can be loaded individually and separately into side by side cartridges and pump through a static mix tube or a dynamic mix tube to achieve complete mixing for the application of the polymerizable adhesive composition.

Substrates used in the present disclosure can be dissimilar materials. The dissimilar materials can include, but are not limited to, coated metals, sheet molding composite (SMC), carbon fibers and thermoplastics. The thermoplastics can include, but are not limited to, polypropylene, thermoplastic olefins, nylon, acrylonitrile-butadiene styrene or other thermoplastics known in the art. The polymerizable adhesive composition may be applied to the substrates with or without any surface treatment, such as a wipe on primer, plasma or corona surface treatment and the like.

The hybrid adhesives of bonding the substrates together can be used in the manufacture of various useful parts and/or articles. The present disclosure can further encompass parts comprising two or more pieces that are adhered together, such as parts for automobiles and other transportation vehicles like a motorcycle, bicycle, train, boat, airplane or space vehicle. The parts can comprise at least two substrates and one or more layers of the hybrid adhesives, which adhere the substrates to each other. The present disclosure is also directed to an article of manufacture containing the hybrid adhesives.

The polymers and their applications according to the present disclosure may be prepared and used according to the examples set out below. These examples are presented herein for purposes of illustration of the present disclosure and are not intended to be limiting, for example, the preparations of the polymers and their applications.

EXAMPLES

Example 1—Prepolymer A1

34.8 grams of Pluracol® P2010, 14.0 grams of dry talc, 1.7 grams of fumed silica, 19.8 grams of Rubinate® 1680, 10.6 grams of Lupranate® M20 (polymeric MDI, commercially available from BASF) were mixed to form a mixture. The mixture was then heated to about 65° C.-70° C. and maintained at the temperature for about 60 minutes. 5 grams of Rubinate 1680, 5.3 grams of molecular sieve Type 5A, and 8.4 grams of tetrahydrofurfuryl methacrylate were added into the mixture to form Prepolymer A1 having a NCO content of about 8 percent.

Example 2—Curative B1

41.3 grams of Acclaim® 4220N, 5.8 grams of Admex™ 525, 19.6 grams of Priplast™ 3238, 22.8 grams of dry talc, 1.5 grams of fumed silica, 5.1 grams of 1,4-butanediol, 1.3 grams of piperazine, 0.045 grams of dibutyltin diisooctylmaleate, 0.12 grams of dibutyltin disulfide, 0.02 grams of dimethylbis[(1-oxoneodecyl)oxy]stannane, and 2.0 grams of tri-n-butylborane-3-methoxy-1-propylamine (TnBB MOPA) were mixed to form Curative B1.

Example 3—Prepolymer A2

35.0 grams of Pluracol® P2010, 14.1 grams of dry talc, 19.9 grams of Rubinate® 1680, and 10.7 grams of Lupranate® M20 were mixed to form a mixture. The mixture was then heated to about 65° C.-70° C. and maintained the temperature for about 60 minutes. 5 grams of Rubinate® 1680, 5.3 grams of molecular sieve Type 5A, 6.6 grams of acrylate terminated urethane/acrylate oligomer (Ebecryl® 4827) and 3.0 grams of tetrahydrofurfuryl methacrylate were added into the mixture to form Prepolymer A2 having a NCO content of about 8.

Example 4—Curative B2

41.7 grams of Acclaim® 4220N, 5.88 grams of Admex™ 525, 19.4 grams of GX-9201, 23.0 grams of dry talc, 2.2 grams of fumed silica, 4.4 grams of 1,4-butanediol, 1.3 grams of piperazine, 0.02 grams of dibutyltin diisooctylmaleate, 0.06 grams of dibutyltin disulfide, 0.01 grams of dimethylbis[(1-oxoneodecyl)oxy]stannane, and 2.0 grams of TnBB MOPA were added to form Curative B2.

Example 5—Prepolymer A3

13.93 grams of Pluracol® P2010, 1.96 grams of Pluracol® TP-440, 7.40 grams of dry talc, 2.92 grams of fumed silica, 28.21 grams of Rubinate® 1680 were mixed to form a mixture. The mixture was then heated to about 65° C.-70° C. and maintained at this temperature for about 60 minutes. 38.16 grams of Rubinate® 1680 and 7.35 grams of molecular sieve Type 5A were added into the mixture to form Prepolymer A3 having a NCO content of about 18.0 percent.

Example 6—Polymer 1

Hydroxyl terminated urethane modified cross-linking adduct Polymer 1 was prepared by blending 52.2 grams of Pluracol TP-440 polyol, 10.20 grams of MDI (Mondur® MLQ, commercially available from Covestro), 4.25 grams of Rubinate 1680 to form a mixture. The mixture was then heated to about 82° C. and continued to mix for about 60 minutes. 33.35 grams of Acclaim 4220N was added into the mixture to form Polymer 1 having an adduct content of about 29 percent.

Example 7—Curative B3

38.70 grams of Polymer 1 prepared in Example 6, 23.08 grams of Acclaim 4220N, 21.30 grams of dry talc, 3.90 grams of fumed silica, 10.0 grams of 1,4-butanediol, 1.26 grams of piperazine, 0.01 grams of dibutyltin diisooctylmaleate, 0.025 grams of dibutyltin disulfide and 1.00 grams of molecular sieve Type A were added to form Curative B3.

Example 8—Prepolymer A4

23 grams of Pluracol® P2010, 12 grams of Priplast 3238, 14 grams of dry talc, 1.5 grams of fumed silica, 37 grams of Rubinate® 1680 were mixed to form a mixture. The mixture was then heated to about 65° C.-70° C. and maintained at this temperature for about 60 minutes. 5 grams of molecular sieve Type 5A, 1 gram of hydroxypropyl methacrylate and 6 grams of tetrahydrofurfuryl methacrylate were added into the mixture to form Prepolymer A4 having a NCO content of about 9 percent.

Example 9—Curative B4

49 grams of Acclaim 4220N, 7.5 grams of Emerox 14001, 5 grams of Capa™ 8025E (a branched co-polyester triol derived from caprolactone monomer, terminated by hydroxyl groups, commercially available from Perstorp Group), 30 grams of dry talc, 1.1 grams of fumed silica, 5.4 grams of 1,4-butanediol, 1.3 grams of piperazine, 0.05 grams of dibutyltin diisooctylmaleate, 0.03 grams of dimethylbis[(1-oxoneodecyl)oxy]stannane, and 1 gram of TnBB MOPA were added to form Curative B4.

Examples 10-15

In Examples 10-15 as shown in Table 1, the prepolymers and curatives prepared in Examples 1-5 and 7-9 along with commercial prepolymer and curative were loaded separately into side by side cartridges and pump through a static mix tube to achieve complete mixing. The mixed polymerizable adhesive compositions were applied directly from the static mix tube onto one side of the testing substrate. The resulted hybrid adhesives were evaluated for bulk physical properties. A lap shear test was conducted to measure the lap shear strength of the adhesive bonds.

The lap shear test sample was prepared by overlapping the last 2.5 cm of a pair of 10 by 2.5 cm coupons to get a 17.8 cm long sample with the adhesive and 0.76 mm glass spacer beads between the overlap. The sample was placed between a two-sided fixture held at a curing temperature until solidified. Then the sample was removed from the fixture and held at about 20 to 25° C. for about 24 to 72 hours for the test. The lap shear test was conducted according to ASTM D5868 with a crosshead speed of 0.127 cm per minute. ASTM D5868 is incorporated herein by reference by its entirety. All adhesives were prepared at an isocyanate index in a range of from about 105 to about 130 unless otherwise noted.

TABLE 1

Prepolymer and Curative Combinations

| Example # | Prepolymer | Curative | Prepolymer/Curative Volume Ratio |
|---|---|---|---|
| 10 | A1 | B1 | 1:1 |
| 11 | A3 | B3 | 1:1 |
| 12 | X2500 Plus A* | X2500 Plus B* | 1:1 |
| 13 | A1 | B2 | 1:1 |

TABLE 1-continued

Prepolymer and Curative Combinations

| Example # | Prepolymer | Curative | Prepolymer/Curative Volume Ratio |
|---|---|---|---|
| 14 | A2 | B1 | 1:1 |
| 15 | A4 | B4 | 1:1 |

*Betaseal™ X2500 Plus Structure Adhesive, commercially available from The Dow Chemical Company.

Table 2 shows the bulk properties of Examples 10-15. All the adhesives were heat cured at about 120° C. for about 15 min and followed by about 30 minutes' post cure at about 150° C. Comparing to Example 11, the adhesives from Examples 10, 12-13 and 15 show significant lower modulus and higher elongation. Example 12 was a commercial low modulus polyurethane adhesive made with large amounts of plasticizers.

TABLE 2

Bulk Physical Properties

| Example # | Tensile (MPa) | Young's modulus (MPa) | Elongation (%) |
|---|---|---|---|
| 10 | 6 | 4 | 301 |
| 11 | 21 | 585 | 87 |
| 12 | 5 | 4 | 150 |
| 13 | 4 | 3 | 233 |
| 15 | 3 | 8 | 157 |

The adhesive prepared from Example 10 was used to bond E-coat to different composites for evaluation. Three different sheet molding composites (SMCs) and two different carbon fibers were used. The adhesives were cured under the conditions shown in Table 3. The lap shear test for the cured adhesives was conducted at room temperature (RT). Both strength and failure pattern (% passing) were evaluated. A minimum of 90% passing failure pattern is required in the industry. The results in Table 3 show that the adhesive of the present disclosure yields high lap strength and excellent adhesion on E-coat to composite bonding.

TABLE 3

Lap Shear Strength of Example 10 on E-coat/Composites

| Substrate | Surface Preparation | Curing Conditions | Lap Shear at RT* Strength (psi) | % pass |
|---|---|---|---|---|
| E-coat/951-SMC | E-coat: IPA wipe<br>SMC: 80 grit sand, dry wipe | 23° C. for 24 hrs | 653 | 100 |
| E-coat/EB310-SMC | E-coat: IPA wipe<br>SMC: IPA wipe, scotch brite, acetone wipe | 23° C. for 24 hrs | 674 | 100 |
| E-coat/EB323-SMC | E-coat: IPA wipe<br>SMC: IPA wipe, scotch brite, acetone wipe | 23° C. for 24 hrs | 608 | 100 |
| E-coat/Plasan Carbon Fiber | E-coat: IPA wipe<br>Carbon Fiber: IPA wipe | 3 min @ 138° C./138° C. | 885 | 100 |
| E-coat/Magna Carbon Fiber | E-coat: IPA wipe<br>Carbon Fiber: 80 grit sand, IPA wipe | 5 min @ 120° C./120° C. | 909 | 100 |

RT = 20-25° C.
IPA = Isopropyl alcohol
E-coat - commercially available from Mack Hils, Inc., Moberly, MO
Plasan Carbon Fiber - commercially available from Plasan Carbon Composites, Walker, MI.
Magna Carbon Fiber - commercially available from Magna International Inc.

The adhesives prepared from Example 10-15 were used to bond polypropylene (PP) to thermoplastic olefin (TPO), which are low surface energy substrates. Table 4 lists the substrates and cure conditions. Trinseo DLGF9411 was 40% fiber glass filled PP, commercially available from Trinseo. Hifax TYC 1235X1. Hifax TYC 1235X2 and Hifax TYC 1175X were thermoplastic olefins, commercially available from Londellbasell.

The substrates used for testing the adhesive from Example 12 were wiped first by IPA, then treated with flame. Betaseal™ 43532 (a body primer, commercially available from The Dow Chemical Company) was then applied on the substrates to achieve good adhesion. The substrates used for testing the adhesives from Examples 10, 11 and 13-15 were wiped with IPA, followed by flame treatment. No primers were applied on these substrates. The lap shear was tested at about 20-25° C. Both strength and failure pattern (% passing) were evaluated. The results listed in Table 4 show that the adhesives have 100% pass and much higher strength compared to the commercial ones without adding any primer. The commercial adhesives in the absence of the primer behave very poorly for the lap shear test. In addition, the adhesive from Example 10 provides higher lap strength and better adhesion than those from Example 12 on PP/TPO substrate with primer under heat cure. Results also show that the adhesives from Example 10 and 15 have higher lap shear strength and excellent adhesion on different PP/TPO substrates under either room temperature cure or heat cure without using any primers.

TABLE 4

Lap Shear Strength on Thermoplastics

| | Substrate | | Curing | Lap shear at RT | |
|---|---|---|---|---|---|
| Example # | PP/TPO | Primer | conditions | Strength (psi) | % pass |
| 12 | Trinseo DLGF9411/Hifax TYC 1235X1 | Betaseal 43532 | 5 min @120° C./23° C. | 544 | 100 |
| 12 | Trinseo DLGF9411/Hifax TYC 1235X1 | Betaseal 43532 | 23° C. for 24 hrs | 564 | 100 |
| 12 | Trinseo DLGF 9411/Hifax TYC 1235X1 | None | 5 min @120° C./23° C. | 180 | 100 |
| 12 | Trinseo DGLF 9411/Hifax TYC 1235X1 | None | 23° C. for 24 hrs | 104 | 15 |
| 11 | Trinseo DGLF9411/Hifax TYC 1235X1 | None | 5 min @120° C./23° C. | 741 | 25 |
| 10 | Trinseo DGLF9411/Hifax TYC 1235X1 | None | 23° C. for 24 hrs | 564 | 100 |
| | Trinseo DGLF9411/Hifax TYC 1235X2) | None | 23° C. for 24 hrs | 587 | 100 |
| | Trinseo DGLF 9411/Hifax TYC 1175X | None | 23° C. for 24 hrs | 540 | 100 |
| | Trinseo DGLF9411/Hifax TYC 1235X1 | None | 5 min @120° C./23° C. | 696 | 100 |
| | Trinseo DGLF 9411/Hifax TYC 1235X2 | None | 5 min @120° C./23° C. | 708 | 100 |
| | Trinseo DGLF 9411/Hifax TYC 1175X | None | 5 min @120° C./23° C. | 597 | 100 |
| 13 | Trinseo DGLF 9411/Hifax TYC 1235X1 | None | 5 min @120° C./23° C. | 419 | 100 |
| 14 | Trinseo DGLF 9411/Hifax TYC 1175X | None | 5 min @120° C./23° C. | 423 | 100 |
| 15 | Trinseo DGLF 9411/Hifax TYC 1235X2 | None | 5 min @ 110° C./70° C. | 656 | 100 |
| | Trinseo DGLF 9411/TYC 1235X2 | None | 23° C. for 24 hrs | 652 | 100 |

What is claimed is:

1. A polymerizable adhesive composition comprising an organoborane complex, a free polyol comprising at least one dimer fatty polyol, and a cardanol based polyester polyol or a poly-ε-caprolactone polyol; and a polyether polyol, at least one free radically polymerizable component, aaa isocyanate-terminated urethane pre-polymer, a free isocyanate, and a low molecular weight chain extending compound, wherein the composition bonds dissimilar material substrates and is free of plasticizers and toughening agents.

2. The polymerizable adhesive composition of claim 1, wherein the dimer fatty polyol is derived from a dimer fatty acid with a diol, or from a dimer fatty diol with a diacid.

3. The polymerizable adhesive composition of claim 2, wherein the diol is selected from the group consisting of ethylene glycol, propane dial, butane diol, hexanediol, and combinations thereof.

4. The polymerizable adhesive composition of claim 2, wherein the diacid is, selected from the group consisting of adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid, and combinations thereof.

5. The polymerizable adhesive composition of claim 1, wherein the polyether polyol is selected from the group consisting of substituted or unsubstituted polyalkylene ether glycols, polyhydroxy polyalkylene ethers, ethylene or propylene oxide adducts of polyols, mono-substituted esters of glycerol, and combinations thereof.

6. The polymerizable adhesive composition of claim 1, wherein the at least one free radically polymerizable component is a monomer selected from the group consisting of an alkyl and cycloalkyl acrylate, an alkyl methacrylate, a hydroxyl alkyl acrylate and methacrylate, and combinations thereof.

7. The polymerizable adhesive composition of claim 1, wherein the low molecular weight chain extending compound is selected from the group consisting of ethylene glycol, diethylene glycol, 1,2-propylene glycol, 1,3-propylene glycol, dipropylene glycol, 1,4-butylene glycol, 1,6-hexylene glycol, neopentyl glycol, 3-methyl pentane glycol, 1,4-cyclohexane-dimethanol, and combinations thereof.

8. The polymerizable adhesive composition of claim 1, wherein the organoborane complex comprises a trialkyl borane with a nitrogen-containing compound.

9. The polymerizable adhesive composition of claim 8, wherein the nitrogen-containing compound is a unsubstituted or substituted amine selected from the group consisting of a primary and tertiary amine.

10. The polymerizable adhesive composition of claim 9, wherein the organoborane complex is selected from the group consisting of triethylborane dimethylaminopropyl amine complex, tributylborane dimethylaminopropyl amine complex, triethylborane pyrrolidine complex, tri-t-butylborane pyrrolidine complex, triethylborane pyridine complex, tri-t-butyl pyridine complex, triethylborane methoxypropyl amine complex, and tributylborane methoxypropyl amine complex.

11. The polymerizable adhesive composition of claim 1, wherein the isocyanate-terminated urethane prepolymer is prepared from polymerization of an excess isocyanate with a polyol.

12. The polymerizable adhesive composition of claim 11, wherein the excess isocyanate is selected from the group consisting of an aromatic diisocyanate, and an aliphatic and cycloaliphatic diisocyanate.

13. The polymerizable adhesive composition of claim 1, further comprising a filler selected from the group consisting of talc, mica, kaolin, bentone clay, aluminum oxides, titanium oxides, iron oxides, barium sulfate, hornblends, amphibiles, chrysotile, carbon black, carbon fibers, fumed silica, molecular sieves and combinations thereof.

14. The polymerizable adhesive composition of claim 1, further comprising a catalyst selected from the group consisting of triethylamine, benzyldimethylamine, triethylenediamine, tetramethylbutanediamine, diazobicycloundecene, stannous acetate, stannous octoate, stannous laurate, stannous oleate, dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate, trialkyltin hydroxide, dialkyltin oxide, dibutyltin disulfide, dibutyl tin diisooctylmaleate, dibutyltin dilauryl mercaptide, dibutyltin di(isooctylmercaptoacetate), zinc neodecanate, iron acetylacetonate, and combinations thereof.

15. A composition of matter comprising at least two substrates each having at least one surface and the polymerizable adhesive composition of claim 1.

16. The composition of matter of claim 15, wherein the substrates comprise unsaturated polyester resin, vinyl ester resin, epoxy resin, metal, polypropylene, thermoplastic olefins, nylon, acrylonitrile-butadiene styrene and combinations thereof.

17. A method for bonding at least two substrates comprising steps of:
    (a) providing a first substrate with at least one surface,
    (b) providing a second substrate with at least one surface,
    (c) providing the polymerizable adhesive composition of claim 1,
    (d) applying the polymerizable adhesive composition to the at lease one surface of the first substrate, second substrate or both the first and second substrates,
    (f) aligning the first substrate and second substrate so that the surface of one of the substrates having the polymerizable adhesive composition is juxtaposed and in contact with the surface of the other substrate and curing the polymerizable adhesive composition.

18. The method of claim 17, wherein the polymerizable adhesive composition is applied with a static or a dynamic mixer.

19. The method of claim 17, wherein the surfaces are treated prior to application of the polymerizable adhesive composition.

* * * * *